Patented Apr. 1, 1952

2,590,912

UNITED STATES PATENT OFFICE 2,590,912

COLD SWELLING STARCH PROCESS

Clifford J. Yarber, Holyoke, Mass., assignor to A. M. Meincke & Son, Inc., a corporation of Illinois No Drawing. Application September 28, 1949, Serial No. 118,480

2 Claims. (Cl. 127—32)

This invention relates to a paper treating compound and a method of preparing the same.

Specifically the invention relates to an improved cold swelling starch and a method of preparing the same.

Cold swelling starches have been known for some time. Oltmans' Patent No. 2,105,052 contains a considerable discussion of such starches and methods of preparing the same, although it does not claim either the product or the process of making the product.

Heretofore cold swelling starches prepared without gelatinization as indicated by Oltmans' patent have been made by mixing the raw starch, such as potato starch, with small amounts of water, generally from ¾ to 2 parts per 1 part of starch. It has been customary to include with the starch alkalizing materials in order to facilitate handling of the material in the drying apparatus, with the result that cold swelling starch as it has come on the market has had a pH, in water extract, of 9 or higher.

The Oltmans patent contains a general description which states that alkalizing or acidizing materials may be incorporated in the starch before, after or during manufacture. No instructions, however, were given for such additions. In the past the addition of acidizing substances has proved detrimental, particularly since the patent points out that under normal conditions the ultimate product is more acid than the normal starch. (See page 2, column 2, lines 34–71.)

I have discovered that by careful control and proper selection of an acidizing medium, a greatly improved cold swelling starch can be produced, particularly for paper making purposes.

My preferred acidizing medium is an acid salt such as monosodium phosphate, which is in itself a buffering agent capable of holding a fairly steady pH. The amount added is sufficient to give a pH of approximately 6.2 to the mixture of water and potato starch prior to conversion. It is desirable not to go substantially below 5.2 pH or above approximately 6.5 pH.

Following adjustment of the pH as described, the starch is converted by heating suddenly above the boiling point under under mechanical pressure, which squeezes it into thin layers. When these layers are dry, they are ground into the proper state of division.

The resulting material is of great value in the preparation of paper, particularly when employed as an engine size by incorporation in the beaters. It produces a paper which gives lower ink penetration, is less fuzzy, has a fold which is better than the same product treated with corn starch. It likewise has an improved Mullen. These improvements are found to take place as compared to the use of cold starch as a size, even in considerably greater quantities. The ordinary alkalized cold swelling starch showed no improvement as compared to the untreated paper in similar tests.

Desirable results have also been obtained by employing the acidized, converted cold swelling starch in combination with corn starch or other sizing materials. For example, a mixture of 3% corn starch and 1% of the acidized cold swelling starch has proved extremely satisfactory.

In incorporating the material in the paper the ordinary beater practice is preferably altered. Ordinary beater furnish has a pH of about 4.5 to 5. In preparing paper with the improved material, this stock is treated with rosin to bring the pH to about 9, and is then brought back down again with alum to approximately the pH of the starch. For example, it is brought down to 6.2 pH. At this stage starch is added, hydration is continued for about fifteen minutes, and then the pH is brought down to about 4.5 to 5 with alum.

The foregoing detailed description is given for clearness of understanding only, and no unnecessary limitations should be understood therefrom, as modifications will be obvious to those skilled in the art.

I claim:

1. The method of preparing a cold swelling starch which comprises mixing a starchy product with a small amount of water, introducing monosodium phosphate into the mixture and controlling said introduction whereby the mixture has a pH of from 5.2 to 6.5, and then converting under drying heat and pressure to a cold swelling starch.

2. The method of claim 1 in which the introduction of said monosodium phosphates is controlled whereby the pH of the mixture is approximately 6.2.

CLIFFORD J. YARBER.

REFERENCES CITED

The following references are of record in the file of this patent:

UNITED STATES PATENTS

| Number | Name | Date |
|---|---|---|
| 2,105,052 | Oltmans | Jan. 11, 1938 |

FOREIGN PATENTS

| Number | Country | Date |
|---|---|---|
| 145,689 | Great Britain | Oct. 31, 1921 |